United States Patent
Sjovall

[19]

[11] Patent Number: 5,819,594
[45] Date of Patent: Oct. 13, 1998

[54] ERGONOMIC HAND GRIP

[75] Inventor: James A. Sjovall, Sioux City, Iowa

[73] Assignee: Sioux Tools, Inc., Sioux City, Iowa

[21] Appl. No.: 611,222

[22] Filed: Mar. 5, 1996

[51] Int. Cl.$^6$ ................................................ B62K 21/26
[52] U.S. Cl. ........................ 74/551.9; 16/111 R; 81/489
[58] Field of Search .................. 16/DIG. 12, 110 R, 16/112, 115, 114 R, 35 R, 111 R; 81/58.3, 177.1, 489, 177.6, 61, 438; 74/551.1, 551.8, 551.9; D8/303, DIG. 8; D12/178, 114; 280/821

[56] References Cited

U.S. PATENT DOCUMENTS

| | | | |
|---|---|---|---|
| D. 323,280 | 1/1992 | Chen | D8/303 |
| 2,091,458 | 8/1937 | Sleight | 74/551.9 X |
| 3,177,910 | 4/1965 | Da Silva . | |
| 3,179,435 | 4/1965 | Miller | 74/551.9 X |
| 3,189,069 | 6/1965 | Stowell | 74/551.9 X |
| 3,344,684 | 10/1967 | Steere et al. | 74/551.9 |
| 3,674,267 | 7/1972 | Hollis | 74/551.9 |
| 3,752,202 | 8/1973 | Condon . | |
| 3,981,043 | 9/1976 | Curry . | |
| 4,189,202 | 2/1980 | Myking | 16/116 R |
| 4,709,602 | 12/1987 | Grabovac et al. . | |
| 4,739,536 | 4/1988 | Bandera et al. | 16/111 R |
| 4,791,837 | 12/1988 | Main . | |
| 4,953,862 | 9/1990 | Uke et al. . | |
| 4,964,192 | 10/1990 | Marui . | |
| 5,018,733 | 5/1991 | Buand | 273/75 |
| 5,042,804 | 8/1991 | Uke et al. . | |
| 5,299,475 | 4/1994 | Stroop . | |
| 5,355,552 | 10/1994 | Huang . | |
| 5,390,572 | 2/1995 | Gakhar et al. . | |

FOREIGN PATENT DOCUMENTS

| | | | |
|---|---|---|---|
| 832882 | 10/1938 | France | 74/551.9 |
| 1139484 | 7/1957 | France | 74/551.9 |

*Primary Examiner*—Vinh T. Luong
*Attorney, Agent, or Firm*—Emrich & Dithmar

[57] ABSTRACT

A grip for a shaft is provided. The grip includes an elongated tubular body having an axis, an outer surface on the body including a polygonal outer surface portion which is polygonal in transverse cross section defining flats joined at vertices and an inner surface on the body including a first inner surface portion opposite the polygonal outer surface portion. The first inner surface portion has a plurality of longitudinally extending grooves respectively disposed parallel to and in radial alignment with the vertices of the polygonal outer surface portion, whereby when the grip is disposed on the shaft and a user's hand applies pressure to one of the vertices, that vertex will flex inwardly toward the shaft thereby relieving pressure on the user's hand.

20 Claims, 3 Drawing Sheets

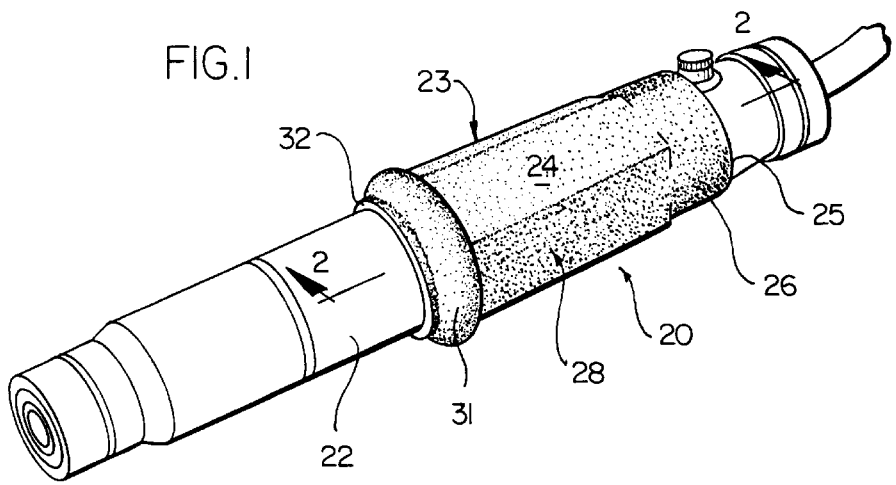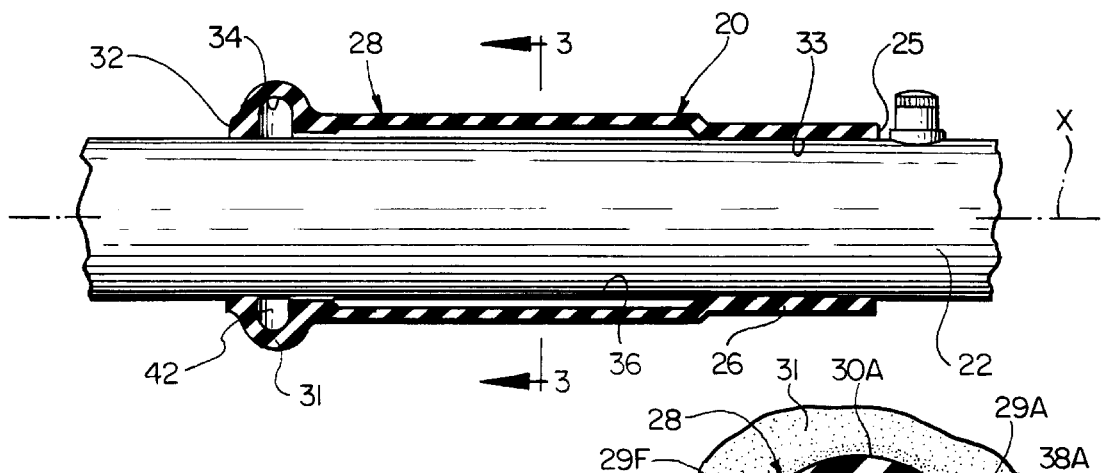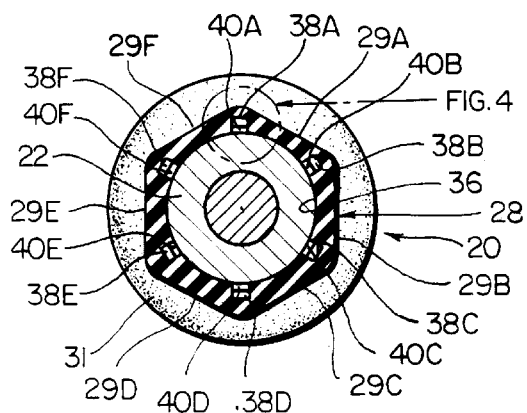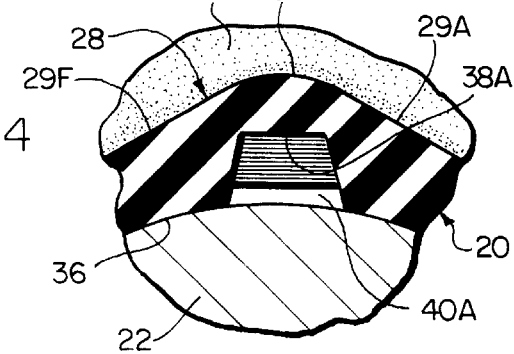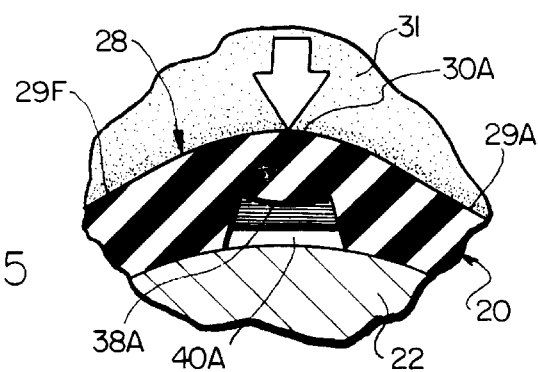

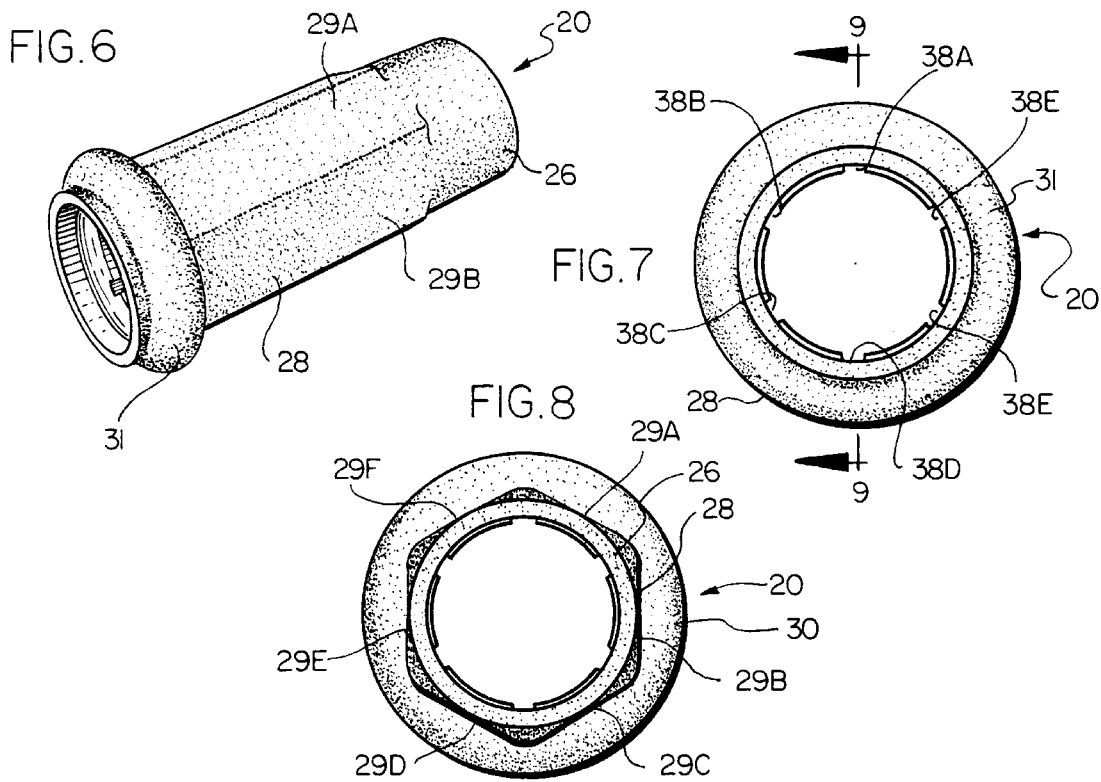
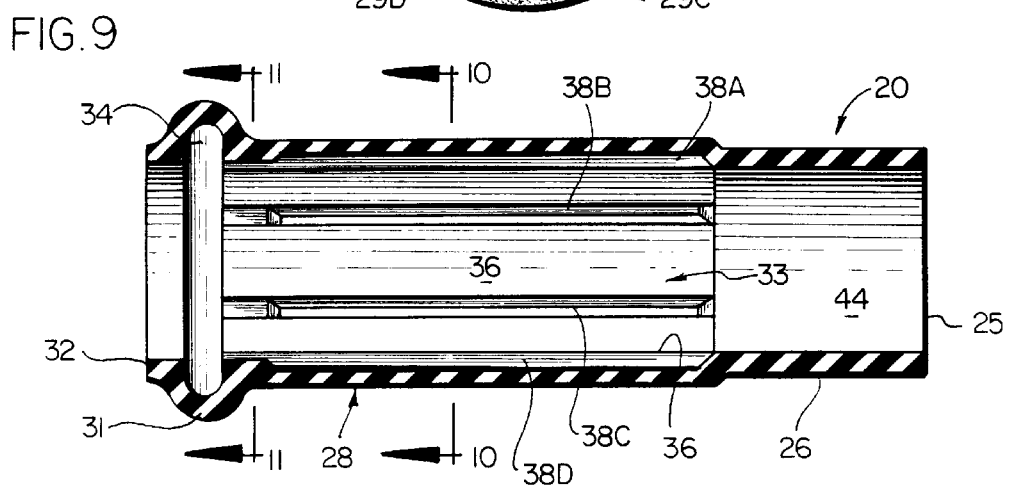
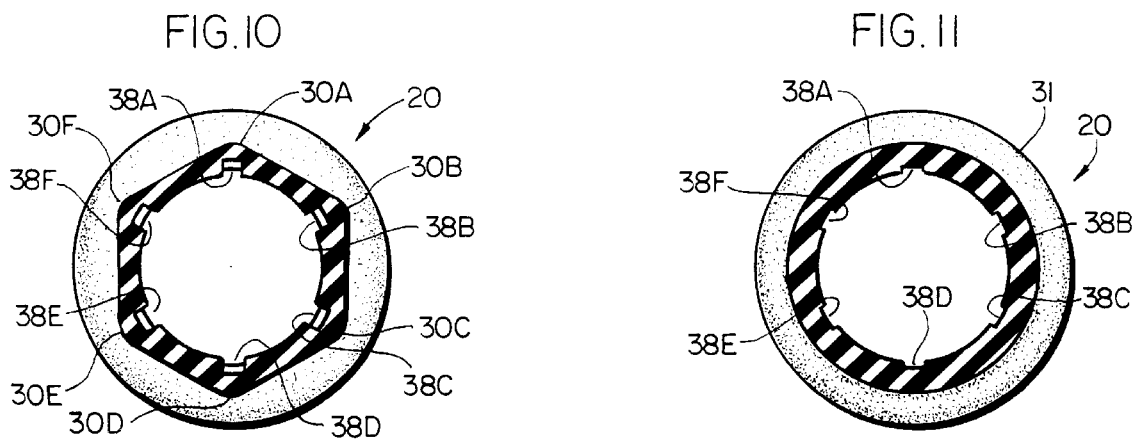

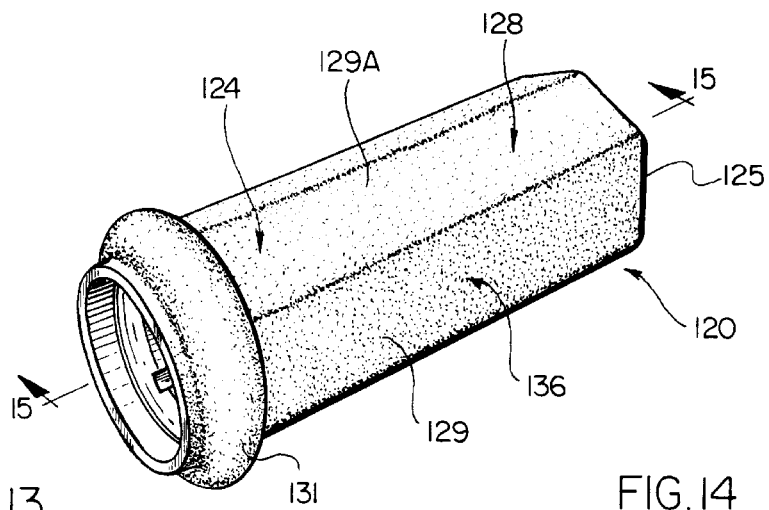
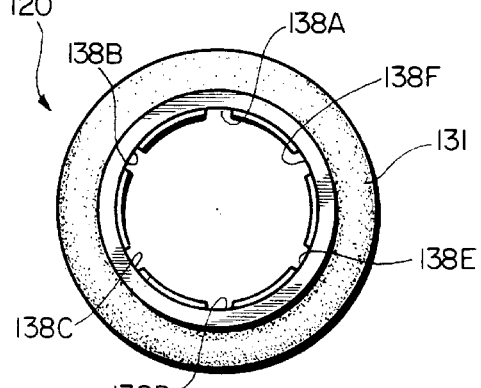
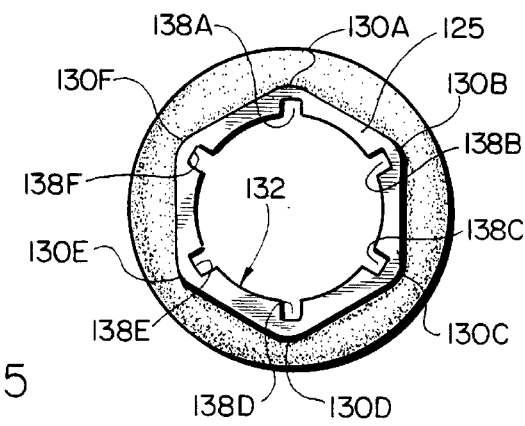
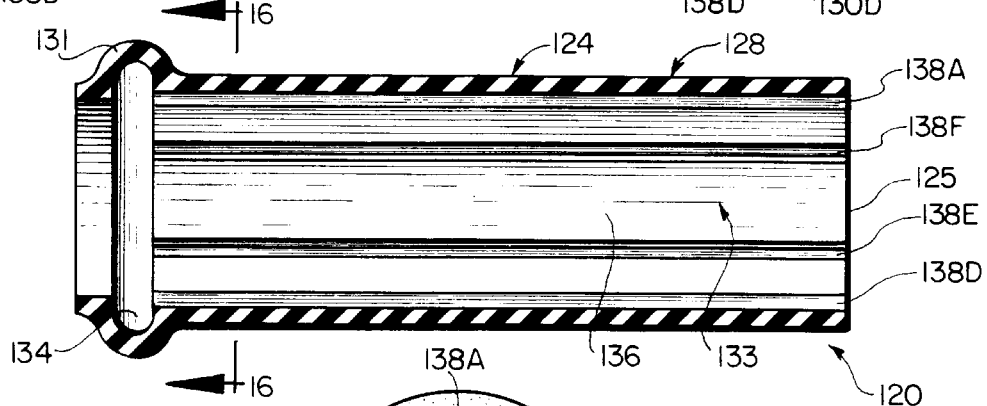
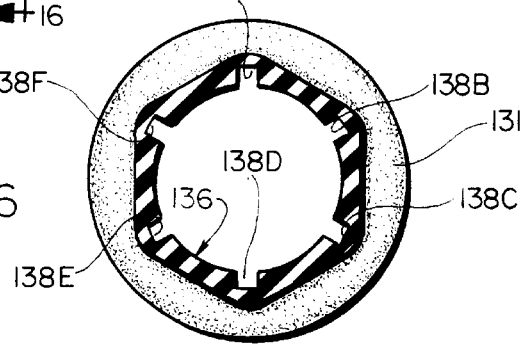

ERGONOMIC HAND GRIP

BACKGROUND OF THE INVENTION

1. Field of the Invention

The present invention relates to hand grips for shafts and, in particular, to ergonomic hand grips.

2. Description of the Prior Art

Power hand tools, such as power screw drivers, typically have a metal shaft which, if grasped by an operator, may move in the operator's hand in use. This movement may make the tool more difficult to operate or cause the tool to slip completely out of the operator's hand where it may cause damage.

Hand grips have therefore been designed to fit over the power tool shafts. These grips are typically made out of a high-friction type rubber or similar material and have an outer surface that is polygonal in transverse cross-section, including flat surfaces joined at vertices. The vertices and the high-friction rubber allow the user to grasp the tool firmly and resist tool rotation within the user's hand due to rotational torque exerted by the tool. Though the vertices of the grip provide the user with a good hand hold of the tool, the vertices apply pressure to the user's hand. When a user operates a tool equipped with such a grip over long periods of time, he may experience discomfort and may develop a motion disorder, such as carpel tunnel syndrome.

SUMMARY OF THE INVENTION

It is a general object of the invention to provide an improved hand grip for a shaft which avoids the disadvantages of prior structures while affording additional structural and operational advantages.

An important feature is the provision of a hand grip which is of relatively simple and economical construction.

A still further feature of the invention is the provision of a grip of the type set forth which provides a user with a good hand hold while not exerting undue damaging pressure on the user's hand.

Yet another feature of the invention is the provision of a grip of the type set forth which provides insulation from the heat or cold generated by the shaft.

These and other features of the invention are attained by providing a grip for a shaft. The grip includes an elongated tubular body having an axis, an outer surface on the body including a polygonal outer surface portion which is polygonal in transverse cross section defining flats joined at vertices and an inner surface on the body including a first inner surface portion opposite the polygonal outer surface portion. The first inner surface portion has a plurality of longitudinally extending grooves respectively disposed parallel to and in radial alignment with the vertices of the polygonal outer surface portion whereby when the grip is disposed on the shaft and a user's hand applies pressure to one of the vertices, that vertex will flex inwardly toward the shaft thereby relieving pressure on the user's hand.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of the grip of the present invention disposed on the shaft of a tool;

FIG. 2 is an enlarged, fragmentary, sectional view taken generally along the line 2—2 of FIG. 1;

FIG. 3 is a sectional view taken generally along the line 3—3 of FIG. 2;

FIG. 4 is a further enlarged, fragmentary, sectional view of a portion of FIG. 3, illustrating one of the grooves of the grip and the shaft in greater detail;

FIG. 5 is a view similar to FIG. 4 after pressure has been applied to a vertex of the grip disposed directly over a groove;

FIG. 6 is an enlarged perspective view of the grip of FIG. 1;

FIG. 7 is a further enlarged front end elevational view of the grip of FIG. 6;

FIG. 8 is a further enlarged rear end elevational view of the grip of FIG. 6;

FIG. 9 is a sectional view taken generally along the line 9—9 of FIG. 7;

FIG. 10 is a sectional view taken generally along the line 10—10 of FIG. 9;

FIG. 11 is a sectional view taken generally along the line 11—11 of FIG. 9;

FIG. 12 is a view similar to FIG. 6 of a grip in accordance with another embodiment of the present invention;

FIG. 13 is a front end elevational view of the grip of FIG. 12;

FIG. 14 is a rear end elevational view of the grip of FIG. 12;

FIG. 15 is a sectional view taken generally along the line 15—15 of FIG. 12; and FIG. 16 is a sectional view taken generally along the line 16—16 of FIG. 15.

DETAILED DESCRIPTION OF THE PREFERRED EMBODIMENTS

Referring to FIGS. 1–3, a tubular ergonomic grip 20 having a longitudinal axis "X" is disposed coaxially on the shaft 22 of a power tool, such as a rotary screwdriver. The grip 20 has a one-piece molded body 23 made out of a flexible, resilient high-friction material, such as vinyl having a hardness of less than about 50 Shore A Durometer, a soft urethane or a neoprene. The material also has thermal insulating properties, so that the grip can insulate an operator's hand from heat or cold generated by the power tool.

The grip 20 has a textured outer surface 24. The outer surface 24 includes at a rear end 25 of the grip 20, a cylindrical outer surface portion 26 adjacent to a polygonal outer surface portion 28 which, as is seen best in FIGS. 1, 3, 6, 8 and 10, is hexagonal in transverse cross section and has six substantially planar sides 29A–F joined at six vertices 30A–F. The grip 20 also includes an annular bulge 31 projecting from the outer surface 24 at a front end 32 of the grip 20.

The grip 20 also has an inner surface 33 that is substantially cylindrical. The bulge 31 defines an annular cavity 34 that opens at the inner surface 33.

The inner surface 33 includes a central inner surface portion 36 disposed opposite and having substantially the same length as the polygonal outer surface portion 28. The central inner surface portion 36, as seen best in FIGS. 3, 4, 5, 9 and 10, includes six circumferentially spaced-apart, elongated indentations or grooves 38A–F, respectively disposed directly under, parallel to and radially aligned with the vertices 30A–F. Each groove 38A–F extends radially outwardly, as seen in FIGS. 3, 7, 8, 10 and 11, from the central inner surface portion 36 toward a respective vertex 30A–F and extends axially substantially the entire length of the central inner surface portion 36. As seen in FIGS. 9–11, each groove 38A–F has tapered ends inclined to the axis "X".

As is best seen in FIGS. 2–5, when the grip 20 is disposed on the shaft 22, six air spaces 40A–F are respectively defined by the shaft 22 and a respective groove 38A–F. Similarly, the annular cavity 34 and the shaft 22 together define an annular air space 42 (FIG. 2).

In use, a user grasps the grip 20 in his hand. The annular bulge 31 acts as a stop or locator for the hand to position the hand over the polygonal outer surface portion 28.

If the grip 20 is disposed on the shaft 22 of a rotary tool, such as a power screwdriver, the tool, in use, will exert rotary torque to an operator's hand. The vertices 30A–F of the polygonal outer surface portion 28 provide strong frictional engagement with the operator's hand to react to this torque to prevent the tool from slipping in the user's hand. It is a significant aspect of the present invention that, because there is a respective air space 40A–F between each vertex 30A–F and the shaft 22, a respective vertex 30A–F, for example with vertex 30A seen in FIGS. 4–5, will flex inwardly toward the shaft 22 when a user applies pressure thereto, thereby reducing the sharpness or acuteness of the respective vertices 30A–F. It is believed that this acuteness reduction will relieve the pressure exerted at the respective vertex 30A–F to the operator's hand.

Though the annular bulge 31 does not have the same degree of acuteness or sharpness as the vertices 30A–F, the annular air space 42 under the annular bulge 31 similarly allows the annular bulge 31 to collapse toward the shaft 22 when pressure is applied to it by an operator's hand, thereby relieving pressure to the operator's hand.

The inner surface 33 also has a cylindrical inner surface portion 44 which does not have any grooves and is opposite the cylindrical outer surface portion 26 and frictionally engages the shaft 22 to aid in preventing relative rotation between the grip 20 and the shaft 22. Being grooveless, the central inner surface portion 44 has more surface contact area to grip the shaft 22.

As seen in FIGS. 12–16, a second ergonomic hand grip 120 is provided that is substantially identical to the grip 20 shown in FIGS. 1–11, except that the grip 120 does not include the cylindrical inner surface portion 44 opposite the cylindrical outer surface portion 26 of the grip 20.

Instead, grip 120 has an outer surface 124 that includes a polygonal outer surface portion 128 which runs from a rear end 125 of the grip 120 to an annular bulge 131 which defines an annular cavity 134 which opens at an inner surface 133. The polygonal outer surface portion 128 is hexagonal in transverse cross-section and has six planar sides 129A–F joined at six vertices 130A–F. The grip 120 has an inner surface 133 which includes an inner surface portion 136 which runs from the annular cavity 134 to the rear end 125 of the grip 120. The inner surface portion 136 includes six grooves 138A–F that have a length substantially equal to the length of the inner surface portion 136. The grooves 138A–F are, respectively, disposed directly under, parallel to and radially aligned with the vertices 130A–F. As seen in FIGS. 13–16, each groove 138A–F extends radially outwardly, from the inner surface portion 136 toward a respective vertex 130A–F and extends axially substantially the entire length of the inner surface portion 136. Like the vertices 30A–F of grip 20, the vertices 130A–F, when the grip 120 is attached to a shaft and have pressure applied thereto, flex inwardly toward the shaft to aid in preventing discomfort to a user.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A grip for a shaft, the grip comprising:
    an elongated tubular body having an axis;
    an outer surface on the body including a polygonal outer surface portion which is polygonal in transverse cross section defining flats joined at vertices; and
    an inner surface on the body including an inner surface portion opposite the polygonal outer surface portion and having a plurality of longitudinally extending grooves respectively disposed in alignment with the vertices of the polygonal outer surface portion along lines intersecting the axis and respectively intersecting the vertices, the grooves being disposed symmetrically about the lines and allowing a greater degree of deflection of the vertices toward the axis than of the flats in response to pressure applied to the polygonal outer surface portion.

2. The grip of claim 1, wherein the body is constructed of a flexible and resilient material.

3. The grip of claim 1, wherein the inner surface portion is substantially circularly cylindrical and each groove extends radially outwardly of the inner surface portion.

4. The grip of claim 3, wherein the inner surface portion and the polygonal outer surface portion are of substantially the same length.

5. The grip of claim 4, wherein each groove runs substantially the length of the inner surface portion.

6. The grip of claim 1, and further comprising an annular bulge disposed at a longitudinal end of the body and projecting from the outer surface to define an annular cavity opening at the inner surface, the bulge being deflectable inwardly toward the axis in response to pressure on the bulge.

7. The grip of claim 1, wherein the polygonal outer surface portion is hexagonal in transverse cross section.

8. A grip for a shaft, the grip comprising:
    an elongated tubular body having an axis and a front end;
    an outer surface on the body including a polygonal outer surface portion which is polygonal in transverse cross section defining flats joined at vertices;
    an inner surface on the body including an inner surface portion opposite the polygonal outer surface portion; and a hollow, annular bulge projecting from the outer surface at the front end of the body and defining an annular cavity opening at and recessed from the inner surface, the annular bulge being deflectable inwardly toward the axis in response to pressure on the bulge.

9. The grip of claim 8, wherein the body is constructed of a flexible resilient material.

10. The grip of claim 8, wherein the polygonal outer surface portion is hexagonal in transverse cross section.

11. The grip of claim 10, wherein the inner surface portion is substantially circularly cylindrical.

12. The grip of claim 11, wherein the inner surface portion includes a plurality of longitudinally extending grooves respectively disposed parallel to and in radial alignment with the vertices of the polygonal outer surface portion, the grooves allowing a greater degree of deflection of the vertices toward the axis than the flats in response to pressure applied to the polygonal outer surface portion.

13. A grip and shaft combination comprising:

an elongated shaft having an axis and an outer shaft surface;

the grip disposed about the shaft, the grip comprising
an elongated tubular body having an axis;
an outer surface on the body including a polygonal outer surface portion which is polygonal in transverse cross section defining flats joined at vertices, and
an inner surface on the body facing the outer shaft surface and including an inner surface portion opposite the polygonal outer surface portion and having a plurality of longitudinally extending grooves respectively disposed in alignment with the vertices of the polygonal outer surface portion along lines intersecting the axis and respectively intersecting the vertices, the grooves being disposed symmetrically about the lines and allowing a greater degree of deflection of the vertices toward the axis than of the flats in response to pressure applied to the polygonal outer surface portion.

14. The combination of claim 13, wherein the body is constructed of a flexible and resilient material.

15. The combination of claim 13, wherein the inner surface portion is substantially cylindrical and each recess extends radially outwardly of the inner surface portion.

16. The combination of claim 15, wherein the inner surface portion and the polygonal outer surface portion are of substantially the same length.

17. The combination of claim 16, wherein each recess is a groove which runs substantially the length of the inner surface portion.

18. The combination of claim 13, and further comprising an annular bulge disposed at a longitudinal end of the body and projecting from the outer surface to define an annular cavity opening at the inner surface, the bulge deflectable inwardly toward the shaft in response to pressure on the bulge.

19. The combination of claim 13, wherein the polygonal outer surface portion is hexagonal in transverse cross section.

20. A grip for a shaft, the grip comprising:

an elongated tubular body having an axis;

an outer surface on the body including an elongated polygonal outer surface portion which is polygonal in transverse cross section defining flats joined at vertices;

an inner surface on the body including an inner surface portion opposite the polygonal outer surface portion; and a hollow, annular bulge disposed at a longitudinal end of the polygonal outer surface portion and projecting from the outer surface and defining an annular cavity opening at and recessed from the inner surface, the annular bulge being deflectable inwardly toward the axis in response to pressure on the bulge.

\* \* \* \* \*